United States Patent
Murao et al.

(10) Patent No.: US 9,533,511 B2
(45) Date of Patent: Jan. 3, 2017

(54) CARRIAGE AND RECORDING APPARATUS AND METHOD FOR MANUFACTURING THE CARRIAGE

(71) Applicant: CANON KABUSHIKI KAISHA, Tokyo (JP)

(72) Inventors: Hitoshi Murao, Tokyo (JP); Kenji Higashiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/700,817

(22) Filed: Apr. 30, 2015

(65) Prior Publication Data

US 2015/0321482 A1   Nov. 12, 2015

(30) Foreign Application Priority Data

May 7, 2014 (JP) ................. 2014-096148

(51) Int. Cl.
*B41J 25/304* (2006.01)
*B41J 25/308* (2006.01)
*B41J 2/175* (2006.01)
*B29C 39/10* (2006.01)
*B29K 59/00* (2006.01)

(52) U.S. Cl.
CPC ............ *B41J 2/17553* (2013.01); *B29C 39/10* (2013.01); *B41J 25/304* (2013.01); *B41J 25/308* (2013.01); *B29K 2059/00* (2013.01); *B41J 25/3086* (2013.01)

(58) Field of Classification Search
CPC ....... B41J 23/00; B41J 25/308; B41J 25/3082; B41J 25/3086; B41J 25/3088; B41J 11/008; B41J 15/08; B41J 15/10; B41J 15/12; B41J 2/15; B41J 2/51; B41J 19/142; B41J 19/16
See application file for complete search history.

(56) References Cited

U.S. PATENT DOCUMENTS

| | | | |
|---|---|---|---|
| 5,575,577 A | 11/1996 | Kawakami et al. | |
| 5,610,636 A | 3/1997 | Hanabusa et al. | |
| 6,666,599 B2 | 12/2003 | Park | |
| 7,384,124 B2 | 6/2008 | Yang | |
| 7,549,714 B2 | 6/2009 | Samoto | |
| 8,109,603 B2 | 2/2012 | Kinoshita | |
| 2005/0001875 A1* | 1/2005 | Ueda ...................... | B41J 25/308 347/37 |
| 2006/0001697 A1 | 1/2006 | Meadows et al. | |
| 2007/0229590 A1 | 10/2007 | Kadota et al. | |

(Continued)

FOREIGN PATENT DOCUMENTS

| | | |
|---|---|---|
| CN | 1496855 A | 5/2004 |
| CN | 1517221 A | 8/2004 |

(Continued)

OTHER PUBLICATIONS

Extended European Search Report in European Patent Application No. 15166342.4, dated Sep. 22, 2015.

(Continued)

*Primary Examiner* — Geoffrey Mruk
(74) *Attorney, Agent, or Firm* — Fitzpatrick, Cella, Harper & Scinto

(57) ABSTRACT

A holding member has a hole with a front tapered shape in a sliding direction of a sliding portion, and the hole and the sliding portion engage with each other.

24 Claims, 4 Drawing Sheets

(56) References Cited

U.S. PATENT DOCUMENTS

2009/0295850 A1 12/2009 Kinoshita
2010/0225694 A1 9/2010 Suzuki

FOREIGN PATENT DOCUMENTS

| EP | 1 231 069 A1 | 8/2002 |
|---|---|---|
| JP | 03-203650 A | 9/1991 |
| JP | 09-66645 A | 3/1997 |
| JP | 2002-248828 A | 9/2002 |
| JP | 2004-034563 A | 2/2004 |
| JP | 2004-223902 A | 8/2004 |
| JP | 2008-106626 A | 5/2008 |
| JP | 2008-137231 A | 6/2008 |
| JP | 2009-285932 A | 12/2009 |

OTHER PUBLICATIONS

Office Action issued in Japanese Patent Application No. 2015-094402, dated Jan. 5, 2016.
Chinese Office Action dated Jul. 6, 2016, in Chinese Patent Application No. 201510226451.1.

\* cited by examiner

CARRIAGE AND RECORDING APPARATUS AND METHOD FOR MANUFACTURING THE CARRIAGE

BACKGROUND OF THE INVENTION

Field of the Invention

The present invention relates to a holding member such as a carriage mainly used for a recording apparatus such as an inkjet printer.

Description of the Related Art

For example, a recording apparatus such as a printer, a copier or a facsimile machine performs printing by scanning a recording head, which ejects ink as a liquid onto a flat recording medium such as paper and a plastic sheet.

The recording head is mounted on a carriage reciprocally movable in a direction perpendicular to a conveying direction of the recording medium (hereinafter, this perpendicular direction is referred to as a main scanning direction). The carriage is slidably supported on a guide extended along the main scanning direction. In such a way, the recording apparatus ejects the ink from the recording head onto the recording medium while reciprocally moving the carriage, and can thereby form a recording image on the recording medium.

In order to improve image quality of the recording image, it is necessary to accurately perform such reciprocal movement in a state where an interval between the recording head and the recording medium (hereinafter, this interval is referred to as a paper interval) is maintained within an appropriate range.

When the recording apparatus performs a recording operation, a surface of the carriage, which is in contact with a guide portion, (hereinafter this surface is referred to as a sliding portion) is gradually worn away. The paper interval is changed by such abrasion of the sliding portion, and the image quality of the recording medium decreases.

Therefore, heretofore, for example, as described in Japanese Patent Application Laid-Open No. 2009-285932, for the carriage, such countermeasures have been taken, in which a holding member that holds the recording head and a sliding member that has the sliding portion are provided as bodies separate from each other, the sliding member is composed of a resin material, metal or the like, which has good slidability, and the holding member and the sliding member are assembled with each other in a subsequent step; however, there has been a problem that assembly cost is increased.

Moreover, in order to reduce an assembly step, it has also been proposed to mold a sliding member, which is made of a different material, integrally with the holding member; however, a clearance occurs in a joint portion of the sliding member and the holding member owing to mold shrinkage and variations of an environmental temperature. As a result, there has been a problem that a backlash occurs at a time when the carriage moves reciprocally, leading to an occurrence of an image defect by inclination of the recording head.

It is an object of the present invention to provide a holding member (carriage) that has the sliding member, the holding member (carriage) having good slidability and being free from the backlash at the time of moving reciprocally.

SUMMARY OF THE INVENTION

A carriage of the present invention is a carriage, in which a sliding member having a sliding portion is fixed to a holding member, and the sliding member slides in a sliding direction, wherein the holding member has a hole portion having a tapered shape in the sliding direction of the sliding portion, and the hole portion and the sliding member engage with each other.

A recording apparatus of the present invention includes the above-described carriage.

A method for manufacturing a carriage according to the present invention is a method for manufacturing a carriage in which a sliding member having a sliding portion is fixed to a holding member, wherein a hole portion having a tapered shape is formed in the holding member, and the sliding member is fixed to the holding member by pouring molten resin into the hole portion.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A first embodiment of the present invention will be described while taking an inkjet recording apparatus (hereinafter, referred to as a recording apparatus) as an example; however, this embodiment is not limited to this, and is applicable to general apparatuses, each of which has a carriage in which a sliding member is formed on a holding member by molding.

Figure 1:
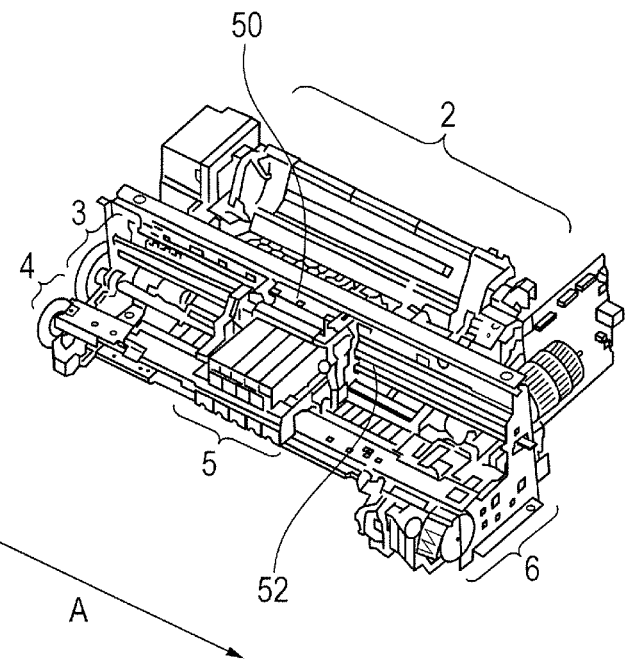
FIG. 1 is a schematic perspective view of a recording apparatus in a first embodiment.
Figure 2:
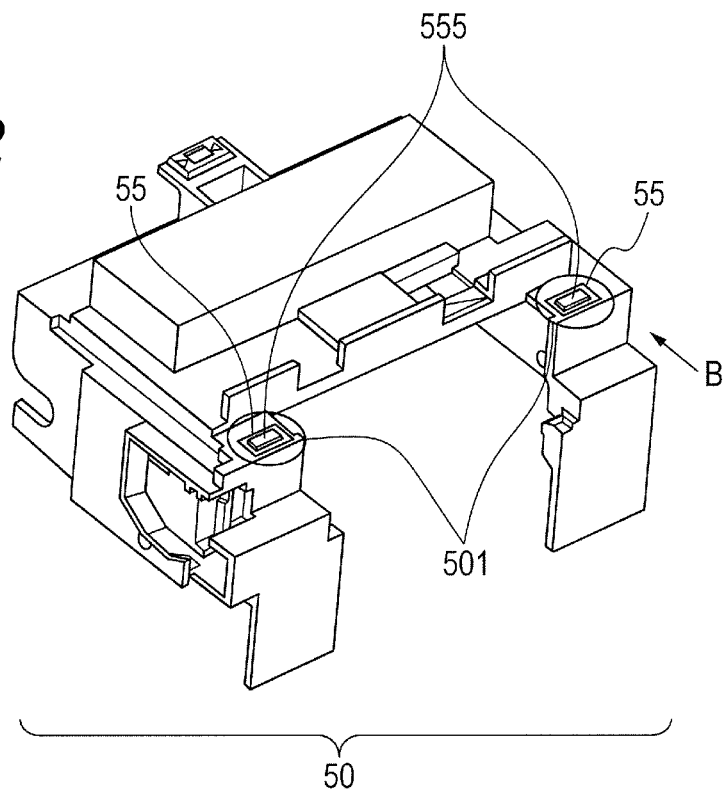
FIG. 2 is a view explaining a carriage in the first embodiment.

FIG. 1 is a schematic perspective view of the recording apparatus in this embodiment, and FIG. 2 is a schematic side view of the recording apparatus of FIG. 1. The recording apparatus 1 includes a feeding unit 2, a conveying unit 3, a discharging unit 4, a carriage unit 5, and a cleaning unit 6.

The carriage unit 5 includes: a recording head 7 (not shown) that ejects ink as a liquid; and a carriage 50 on which the recording head 7 is mounted. Moreover, the carriage 50 includes: sliding members (not shown); and holding members which hold the sliding members. The carriage 50 is moved reciprocally in a sliding direction A while bringing the sliding member into contact with a guide portion 52. In such a way, the recording head can be moved reciprocally with respect to a recording medium in a state where an interval between the recording head and the recording medium (hereinafter, this interval is referred to as a paper interval) is maintained within an appropriate range. The liquid (for example, ink) is ejected from the recording head, whereby recording is performed for the recording medium.

The recording medium is stacked in the feeding unit 2, and is conveyed via the conveying unit 3 to a position opposite to the recording head. The recording medium for which the recording is performed is discharged via the discharging unit 4 to an outside of the recording apparatus 1. The cleaning unit 6 is provided in order to perform recovery processing for the recording head.

FIG. 2 is a perspective view of the carriage 50 in this embodiment. In order to facilitate the understanding, the carriage 50 is shown so that the sliding member in contact with the guide portion 52 can face upward. That is to say, usually, the carriage shown in FIG. 2 is attached to the recording apparatus 1 in a state of being rotated to a right side by 90 degrees (that is, a state where sliding portions 555 are located at a lower side).

As shown in FIG. 2, the carriage 50 of this embodiment is composed of at least holding members 501 and a sliding member 55 having the sliding portions 555. The sliding portions 555 are parts of the sliding member 55, and are fixed to the holding members 501 by the sliding members 55.

For the sliding member 55 that composes the sliding portions 555, it is necessary to use a material that is resistant to wearing away and has good slidability; however, rigidity of the material with good slidability is low in general, and the material is not suitable for the holding members. For the holding members 501, it is necessary to use members with high rigidity, and accordingly, the sliding members 55 and the holding members 501 are molded from materials different from each other. For the sliding members 55, for example, a material with good slidability, such as polyacetal (POM), is used. Then, for the holding members 501, for example, resin containing filler or the like is used. In such a way, it becomes possible to fabricate a carriage, in which functionally necessary rigidity is ensured, and the sliding portions are resistant to wearing away to bring good durability. However, a linear expansion coefficient of a general filler-reinforced material is 3 to $5 \times 10^{-5}$ mm/mm/° C., and a linear expansion coefficient of polyacetal is approximately $10 \times 10^{-5}$ mm/mm/° C., which is approximately 2 to 4 times the linear expansion coefficient of the general filler-reinforced material. Because of such a difference in linear expansion coefficient, backlash caused by a difference in shrinkage ratio is prone to occur at a time of molding the sliding members 55 and the holding members 501.

Figure 3:
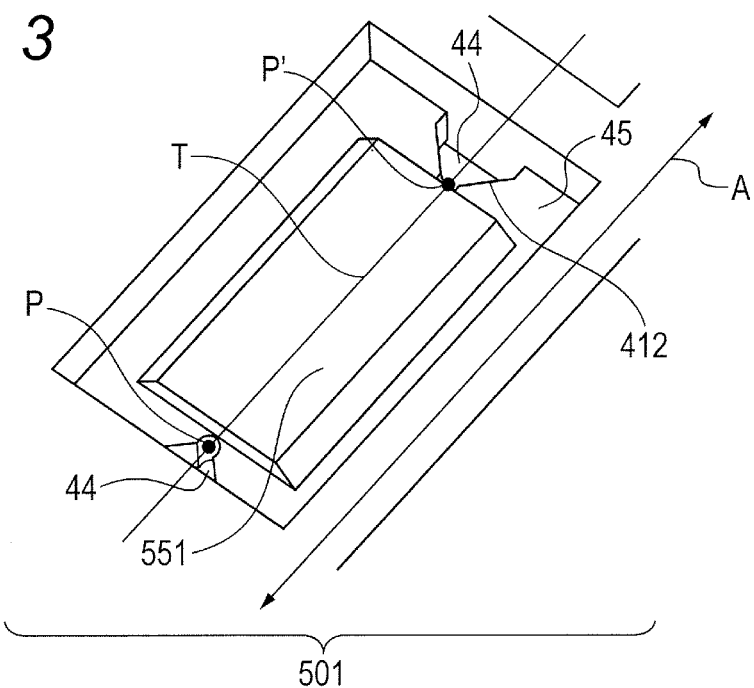
FIG. 3 is a perspective view of a holding member in the first embodiment.

FIG. 3 is a top perspective view of a part of the holding member 501 in this embodiment.

As shown in FIG. 3, in each of the holding members 501, on portions adjacent, in the sliding direction A, to a portion 551 on a surface of which the sliding portion is formed, opening portions (holes) 44 are formed, which have tapered shapes gradually narrowed toward the portion 551 on which the sliding portion is formed. In this specification, the tapered shapes (two inclined surfaces) of the opening portions (holes) 44 having the tapered shapes concerned are sometimes referred to as tapered portions 412. It is preferable to form the opening portions (holes) 44, which have the tapered shapes on the adjacent portions on both sides of the portion 551 in the sliding direction A. That is to say, it is preferable to form at least two opening portions (holes) 44. A line, which connects vertices P and P' of the both-side tapered shapes of the opening portions (holes) 44 having the tapered shapes concerned to each other, is provided so as to be parallel to the sliding direction A of the carriage 21. That is to say, the tapered portions are formed so that the line, which connects such points P and P' to each other, can be parallel to the sliding direction A of the carriage 21. Here, at the points P and P', vertex portions (lines at which two inclined surfaces intersect each other) of the respective tapered portions of the opening portions (holes) 44 and cross sections perpendicular to the vertex portions intersect each other. Then, in this holding member 501, the portion 551 on the surface of which the sliding portion is formed and the opening portions 44 are filled with molten resin by pouring the molten resin thereinto, whereby the sliding member 55 is formed, and the sliding member 55 and the opening portions (holes) 44 engage with each other. The poured resin coats the surface of the portion 551 of the holding member 501, on which the sliding portion 551 is formed, and in addition, is poured into the opening portions (holes) 44, the opening portions (holes) 44 are filled therewith, and anchor portions 67 are formed on a back surface of the holding member 501. In such a way, the sliding member 55 and the opening portions (holes) 44 engage with each other. Then, the sliding portion 555 is fixed to the holding member 501. Here, in this specification, the feature that the holding member 501 and the sliding member 55 are in contact with each other, or alternatively, the feature that the holding member 501 and the sliding member 55 are partially molten and are integrated with each other is defined as "engagement".

Figure 4:
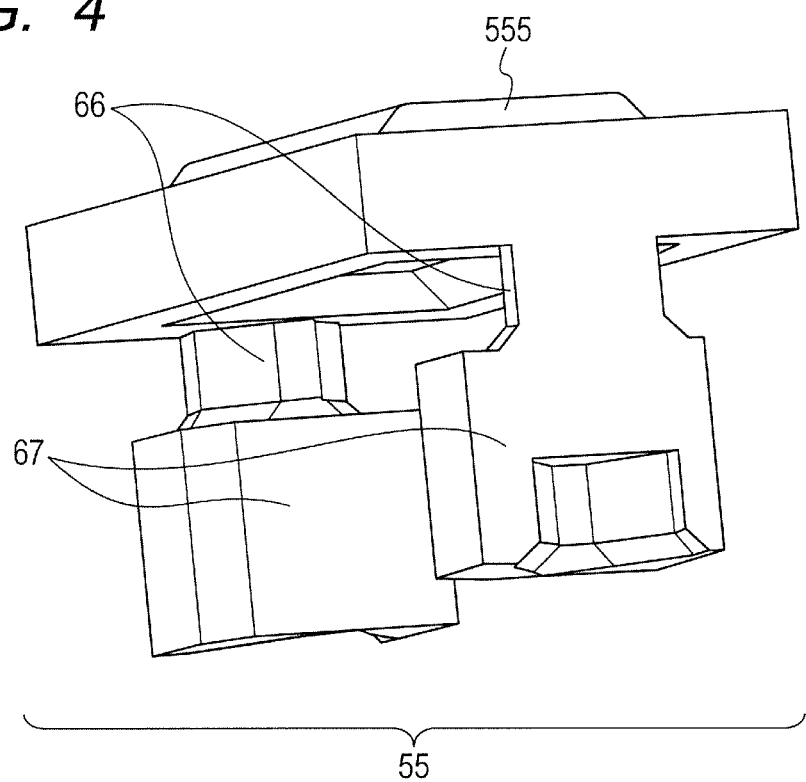
FIG. 4 is a view explaining a sliding member in the first embodiment.

FIG. 4 is a view extracting and showing only the sliding member 55. In the sliding member 55, there are formed: portions (leg portions) 66 with a shape corresponding to that of the opening portions 44 (the leg portions 66 are portions engaged with the holes of the opening portions 44); and the anchor portions 67 formed via the opening portions 44 on an opposite side of the holding member 501 to the portion 551 on the surface of which the sliding portion is formed. In such a way, the sliding portion 555 is fixed to the holding member 501.

That is to say, the sliding member 55 includes: the sliding portion 555; at least two leg portions 66 arranged in line in the sliding direction of the sliding portion 555; and the anchor portions 67 formed on the respective tip end portions of the at least two leg portions 66. The leg portions 66 have a columnar shape protruding from an opposite side of the sliding portion 555 to a sliding surface 556 (refer to FIG. 5A), and at least a part of each thereof engages with the tapered portion 412 (refer to FIG. 3) of the holding member 501, and has a tapered shape. That is to say, the leg portions 66 engage with the holes of the opening portions 44 of the holding member 501. Then, at least a part of the holding member 501 is sandwiched between the at least two leg portions 66, whereby the sliding member 51 is fixed to the holding member 501. Moreover, the sliding member 51 can be fixed to the holding member 501 more robustly by the anchor portions 67 provided on the tip ends of the leg portions 66.

Figure 5A:
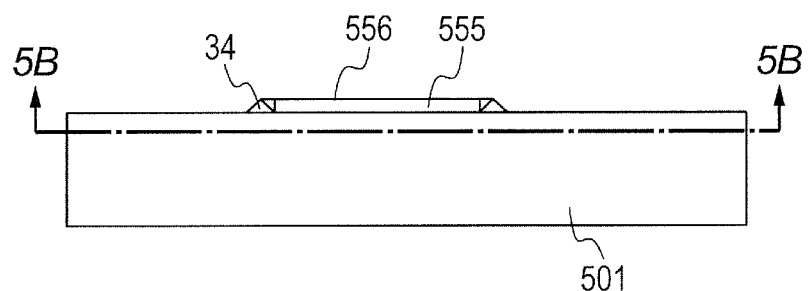
FIGS. 5A and 5B are views explaining the holding member and the sliding member in the first embodiment.
Figure 5B:
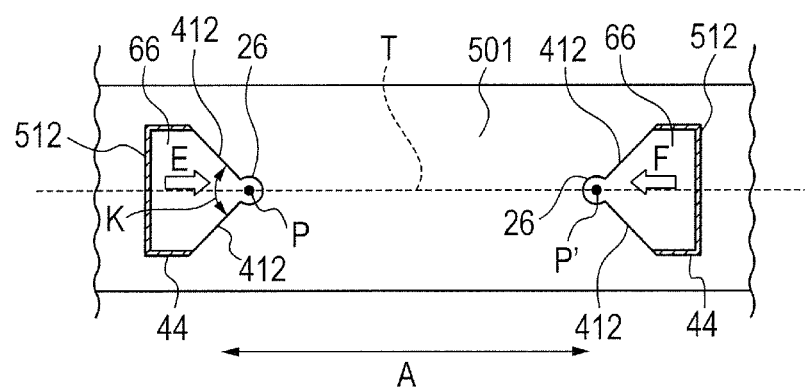

FIGS. 5A and 5B are views explaining the holding member 501 and the sliding member 55. FIG. 5A is a view where each of the holding members 501 and each of the sliding portions 555 in the carriage 50 shown in FIG. 2 are viewed from a direction of an arrow B. FIG. 5B is an enlarged view of a 5B-5B cross section of FIG. 5A.

As shown in FIG. 5A, the sliding surface 556 of the sliding portion 555 protrudes from the holding member 501, for example, by 0.5 mm. Moreover, a corner round 34 is formed on a ridge line of the sliding surface 556. In such a way, when the carriage 50 moves reciprocally in the sliding direction A, a portion other than the sliding surface 556 is not brought into contact with the guide portion 52 even in a case where the carriage 50 is inclined owing to vibrations and the like.

As shown in FIG. 5B, in comparison with the holding member 501, the sliding member 55 into which the molten resin is poured shrinks to a large extent in directions of arrows E and F due to the difference in linear expansion coefficient immediately after the molding, and clearances 512 occur between the sliding member 55 and the holding member 501. However, the opening portions 44 with the tapered shape are formed in the holding member 501 in advance, whereby the sliding member 55 shrinks along such tapered inclined surfaces (tapered portions) 412 of the opening portions. Moreover, protruding shapes 26 are provided in advance on vertex portions (vertices) P and P' of the tapered portions 412, whereby abutment of only the vertex portions (vertices) 44 is prevented, and the inclined surfaces 412 and the sliding member 55 are surely brought into surface contact with each other. That is to say, the sliding member 55 shrinks in a direction of a straight line T that connects the vertices P and P' of the tapered shapes of the opening portions 44 of the holding member 501 to each other while sandwiching the sliding portion 555 between the opening portions 44.

That is to say, the opening portions 44 having the tapered portions 412 are formed in the holding member 501 in advance, whereby the sliding member 55 can be shrunk in the direction along the straight line T that connects the vertices P and P' of the tapered portions 412 of the holding member 501 to each other. In such a way, the sliding surface 556 of the sliding portion 555 is not inclined, and the sliding member 55 can be held on the holding member 501. Any angle K of such tapers of the tapered portions 412 is effective as long as the tapers are inclined with respect to the straight line T; however, preferably, the angle K is 30 degrees or more to 150 degrees or less. If the angle K is smaller than 30 degrees, then the legs are thinned, causing a possibility that strength thereof may fall short. If the angle K is larger than 150 degrees, then it becomes necessary to ensure a wide width of the holding member 501, causing a size increase of the holding member 501. Here, the angle K of the tapers of the tapered portions 412 is an angle made by two inclined surfaces as the tapered portions 412.

This embodiment shows an example where the tapered portions 412 of the opening portions 44 formed in the holding member 501 are formed on a side close to the opening portions 44 adjacent thereto. However, the tapered portions 412 may be formed on a plurality of spots of each of the opening portions 44. Note that, in a case of forming the tapered portion 412 on one spot of each of the opening portions 44, such a spot where the tapered portion 412 is formed can be decided based on linear expansion coefficients of materials which form the holding member 501 and the sliding member 55. In a case where the linear expansion coefficient of the holding member 501 is smaller than that of the sliding member 55, then the tapered portion 412 is formed on the side close to other opening portion 44 of the at least two opening portions 44 as in this embodiment. In a case where the linear expansion coefficient of the holding member 501 is larger than that of the sliding member 55, then the tapered portion 412 is formed on an opposite side to that of this embodiment, that is, an opposite side to the side close to the other opening portion 44.

In such a way, the sliding portion 555 is tightly fixed to the holding member 501 in parallel to the direction of the straight line T that connects the vertices P and P' of the tapered shapes of the opening portions 44 of the holding member 501 to each other. In this specification, the direction of the straight line T refers to a direction along the straight line T (that is, a direction parallel to the direction of the straight line T). Moreover, the vertices of the tapered portions (tapered shapes) refer to points where the vertex portions (lines at which two inclined surfaces intersect each other) of the respective tapered portions and the cross sections perpendicular to the vertex portions intersect each other. Hence, such a parallel state of the sliding portion 555 and the sliding direction A of the carriage 50 is maintained, and the carriage 50 according to this embodiment can prevent the backlash of the sliding portion 555 (sliding member 55) even if the clearances 512 occur due to such molding shrinkage.

Moreover, since the straight line T that connects the vertices P and P' of the opening portions 44 to each other is arranged in parallel to the sliding direction, an occurrence of a positional shift of the sliding portion 555 (sliding member) at the time when the carriage moves reciprocally is suppressed.

Manufacturing Method in First Embodiment

Next, a description is made of a method for manufacturing the holding member (carriage) of the first embodiment.

As the material of the holding member 501, resin reinforced by various types of filler is mainly used.

Moreover, as the material of the sliding member 55, a material with good slidability, such as polyacetal (POM), is used. In such a way, it becomes possible to fabricate the carriage, in which the functionally necessary rigidity is ensured, and the sliding portions are resistant to wearing away to bring good durability.

Preferably, the holding member 501 and the sliding member 55 are manufactured by a method (integral molding) of fixing the sliding member 55 to the holding member 501 by injecting resin into a metal mold and molding the resin, the resin being obtained by melting the materials thereof. A method known heretofore can be used for the integral molding. For example, a method of continuously molding the sliding member 55 after molding the holding member 501 can be used. Moreover, there is also usable a method of molding the holding member 501 in advance, inserting the molded holding member 501 into the metal mold, thereafter injecting the molten resin into a cavity in which the sliding member 55 is to be molded, and fixing the sliding member 55 to the holding member 501.

It is necessary that the sliding portion 555 slide with respect to the guide portion 52 in a favorable manner. Accordingly, it is preferable that a gate not be formed in the cavity having a shape for forming the sliding portion 555, but that a flow passage and the like be formed separately and the sliding member 55 be molded so that the sliding surface 556 of the sliding portion 555 can become as smooth as possible.

Second Embodiment

This embodiment is common to the first embodiment in many points, and accordingly, a description is made of portions particularly different from those of the first embodiment. In this embodiment, the shape of the opening portions 44 of the holding member 501 in the first embodiment is changed. A description is made below of this change by using FIGS. 6A to 6C.

Figure 6A:
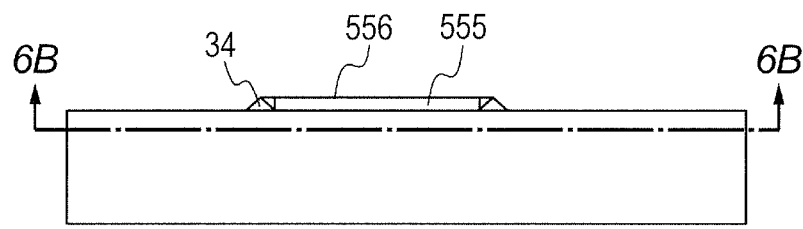
FIGS. 6A, 6B and 6C are views explaining a holding member and a sliding member in a second embodiment.
Figure 6B:
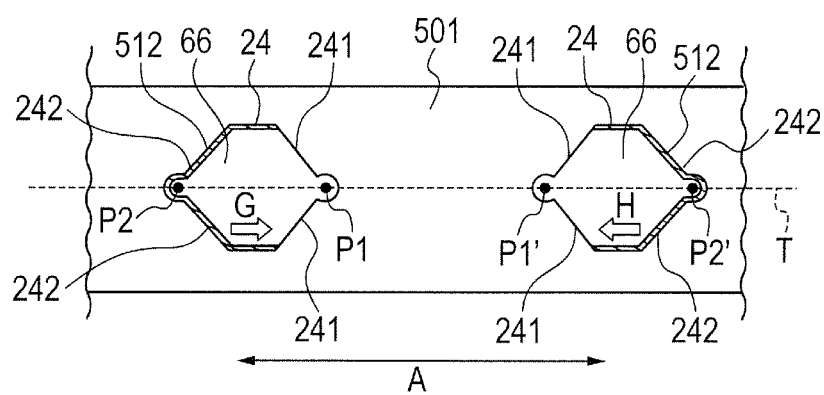
Figure 6C:
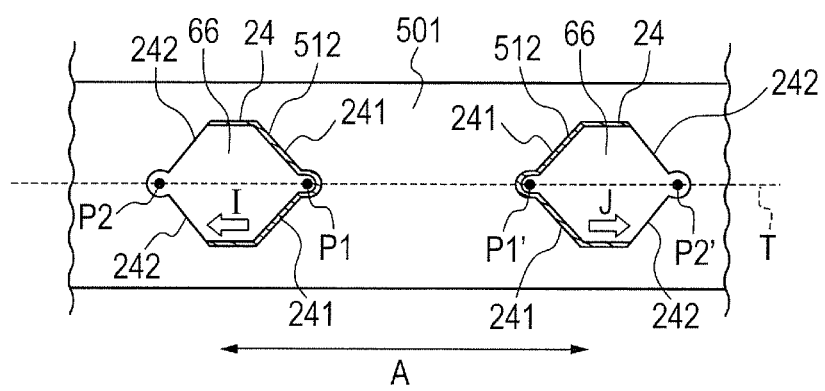

FIGS. 6A to 6C are views showing the holding member 501 and the sliding member 55. The same reference numerals are assigned to portions having the same functions as those of the first embodiment, and a description thereof is omitted. FIG. 6A is a view where the holding member 501 and the sliding portion 555 in the carriage 50 shown in FIG. 2 are viewed from the direction of the arrow B. FIG. 6B and FIG. 6C are enlarged views of a 6B-6B cross section of FIG. 6A.

As shown in FIG. 6B and FIG. 6C, a shape of each of opening portions 24 formed in the holding member 501 is composed of: an inside 241 in which a tapered portion faces to the sliding portion 555; and an outside 242 in which a tapered portion faces to an opposite side to the sliding portion.

That is to say, this embodiment shows an example where at least two opening portions 24 are provided and a plurality of the tapered portions are provided in each of the opening portions 24. In FIG. 6B and FIG. 6C, this example shows a form in which two tapered portions 241 and 242 are provided in each of the opening portions 24. These two tapered portions are formed as: the tapered portion 241 on a side (inside facing to the sliding portion) close to the other opening portion 24 of the at least two opening portions 24 thus provided; and the tapered portion 242 on a side (outside facing to the opposite side to the sliding portion) distant from the other opening portion 24.

In a case where a linear expansion coefficient of the holding member 501 is smaller than a linear expansion coefficient of the sliding member 55, then as shown in FIG. 6B, the sliding member 55 shrinks to a large extent in directions of arrows G and H, and clearances 512 occur between the outside tapered shapes 242 and leg portions 66 of the sliding member 55. However, the inside tapered shapes 241 are formed in advance, whereby the leg portions 66 of the sliding member 55 shrink along inclined surfaces of the inside tapered shapes 241. Moreover, protruding shapes 26 are provided in advance on vertex portions (vertices) P1 and P1' of the tapered portions 241, whereby abutment of only the vertex portions (vertices) is prevented, and the inclined surfaces of the tapered shapes 241 and the leg portions 66 of the sliding member 55 are surely brought into surface contact with each other. That is to say, the sliding member 55 shrinks in a direction of a straight line T that connects vertices P1 and P1' of the inside tapered shapes 241 to each other while sandwiching the sliding portion 555 between the opening portions 24. Then, the sliding member 55 and the opening portions (holes) 24 of the holding member 501 engage with each other.

In such a way, the sliding portion 555 (sliding member 55) is tightly fixed to the holding member 501 in parallel to the direction of the straight line T that connects the vertices P1 and P1' of the inside tapered shapes (tapered portions) 241 to each other. Hence, such a parallel state of the sliding portion 555 and the sliding direction A of the carriage 50 is maintained, and the carriage 50 according to this embodiment can prevent the backlash of the sliding portion 555 (sliding member 55) even if the clearances caused by the molding shrinkage occur.

Moreover, since the straight line T that connects the vertices P1 and P1' of the tapered portions 241 of the opening portions 24 to each other is arranged in parallel to the sliding direction, the occurrence of the positional shift of the sliding portion 555 (sliding member 55) at the time when the carriage 50 moves reciprocally is suppressed.

On the contrary, in a case where the linear expansion coefficient of the holding member 501 is larger than the linear expansion coefficient of the sliding member 55, then as shown in FIG. 6C, the holding member 501 shrinks to a large extent in directions of arrows I and J, and clearances 512 occur between the inside tapered shapes 241 and the leg portions 66 of the sliding member 55. However, the outside tapered shapes (tapered portions) 242 are formed in advance, whereby the leg portions 66 of the sliding member 55 shrink along inclined surfaces of the outside tapered shapes (tapered portions) 242. Moreover, the protruding shapes 26 are provided in advance on the vertex portions (vertices) P2 and P2' of the tapered portions 242, whereby the abutment of only the vertex portions (vertices) P2 and P2' is prevented, and the inclined surfaces of the tapered shapes 242 and the leg portions 66 of the sliding member 55 are surely brought into surface contact with each other. That is to say, the sliding member 55 shrinks in a direction of a straight line T that connects the vertices P2 and P2' of the outside tapered shapes (tapered portions) 242 to each other.

In such a way, the sliding portion 555 is fixed to the holding member 501 in parallel to the direction of the straight line T that connects the vertices P2 and P2' of the outside tapered shapes (tapered portions) 242 to each other. Hence, such a parallel state of the sliding portion 555 and the sliding direction A of the carriage 50 is maintained, and the carriage 50 according to this embodiment can prevent the backlash of the sliding portion 555 (sliding member 55) even if the clearances caused by the molding shrinkage occur.

Moreover, since the straight line T that connects the vertices P2 and P2' of the opening portions 24 to each other is arranged in parallel to the sliding direction, the occurrence of the positional shift of the sliding portion 555 at the time when the carriage 50 moves reciprocally is suppressed. The holding member (carriage) of the present invention does not cause the backlash at the time of moving reciprocally, and can prevent the image defect caused by the inclination of the recording head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-096148, filed May 7, 2014 which is hereby incorporated by reference herein in its entirety.

What is claimed is:

1. A carriage movable in a sliding direction, in which a sliding member having a sliding portion is fixed to a holding member, and the sliding member has at least two leg portions,
    wherein the holding member has a hole portion having a tapered shape in which an inner surface of the hole portion is gradually narrowed in the sliding direction,
    wherein the leg portions of the sliding member have a tapered shape gradually narrowed in the sliding direction, and
    wherein the sliding member sandwiches a portion of the holding member between the two leg portions, and the inner surface of the hole portion is fitted into the tapered shape of the leg portions of the sliding member.

2. The carriage according to claim 1, wherein a clearance is provided between a portion of the inner surface of the hole portion and the sliding member.

3. The carriage according to claim 1, wherein each of the leg portions of the sliding member has a shape in which a protruding shape is provided on a tip portion of the tapered shape.

4. The carriage according to claim 1, wherein a linear expansion coefficient of the holding member is smaller than a linear expansion coefficient of the sliding member.

5. The carriage according to claim 1, wherein a linear expansion coefficient of the holding member is larger than a linear expansion coefficient of the sliding member.

6. The carriage according to claim 1, wherein the holding member is molded from resin containing filler.

7. The carriage according to claim 1, wherein the sliding member is molded from resin containing polyacetal (POM).

8. The carriage according to claim 1, wherein the holding member and the sliding member are molded integrally with each other.

9. A recording apparatus comprising:
the carriage according to claim 1.

10. A method for manufacturing a carriage movable in a sliding direction, in which a sliding member having a sliding portion is fixed to a holding member and the sliding member has at least two leg portions,
wherein a hole portion having a tapered shape in which an inner surface of the hole portion is gradually narrowed in the sliding direction is formed in the holding member, and the sliding member having at least two leg portions and sandwiching a portion of the holding member between the two leg portions is fixed to the holding member by pouring molten resin into the hole portion.

11. The method for manufacturing a carriage according to claim 10, wherein a linear expansion coefficient of the holding member is smaller than a linear expansion coefficient of the sliding member.

12. The method for manufacturing a carriage according to claim 10, wherein a linear expansion coefficient of the holding member is larger than a linear expansion coefficient of the sliding member.

13. The method for manufacturing a carriage according to claim 10, wherein the holding member is molded from resin containing filler.

14. The method for manufacturing a carriage according to claim 10, wherein the molten resin is polyacetal (POM).

15. A carriage movable in a sliding direction, in which a sliding member having a sliding portion is fixed to a holding member, and the sliding member has at least two leg portions,
wherein the holding member has two hole portions arranged along the sliding direction, and
wherein the sliding member sandwiches a portion of the holding member between the at least two leg portions, and the at least two leg portions are fitted into the holding member.

16. The carriage according to claim 15, wherein clearances are provided between a portion of the inner surface of each of the two hole portions and the two leg portions.

17. The carriage according to claim 16,
wherein each of the two leg portions is fitted into the holding member, with the holding member sandwiched therebetween.

18. The carriage according to claim 16,
wherein each of the two leg portions has one of the clearances between the leg portion and the holding member.

19. The carriage according to claim 15, wherein a linear expansion coefficient of the holding member is smaller than a linear expansion coefficient of the sliding member.

20. The carriage according to claim 15, wherein a linear expansion coefficient of the holding member is larger than a linear expansion coefficient of the sliding member.

21. The carriage according to claim 15, wherein the holding member is molded from resin containing filler.

22. The carriage according to claim 15, wherein the sliding member is molded from resin containing polyacetal (POM).

23. The carriage according to claim 15, wherein the holding member and the sliding member are molded integrally with each other.

24. A recording apparatus comprising:
the carriage according to claim 15.

* * * * *